United States Patent
Ichikawa (10) Patent No.: US 10,473,039 B2
(45) Date of Patent: Nov. 12, 2019

(54) EXHAUST PURIFYING DEVICE AND WORKING VEHICLE

(71) Applicant: Komatsu Ltd., Minato-ku, Tokyo (JP)

(72) Inventor: Genki Ichikawa, Tokyo (JP)

(73) Assignee: Komatsu Ltd.

( * ) Notice: Subject to any disclaimer, the term of this patent is extended or adjusted under 35 U.S.C. 154(b) by 133 days.

(21) Appl. No.: 15/538,006

(22) PCT Filed: Feb. 6, 2017

(86) PCT No.: PCT/JP2017/004253
§ 371 (c)(1),
(2) Date: Jun. 20, 2017

(87) PCT Pub. No.: WO2017/138495
PCT Pub. Date: Aug. 17, 2017

(65) Prior Publication Data
US 2018/0223744 A1  Aug. 9, 2018

(51) Int. Cl.
*F01N 3/20* (2006.01)
*F02D 9/04* (2006.01)
(Continued)

(52) U.S. Cl.
CPC ............ *F02D 9/04* (2013.01); *F01N 3/103* (2013.01); *F01N 3/2066* (2013.01);
(Continued)

(58) Field of Classification Search
CPC .. F01N 3/103; F01N 2240/36; F01N 2260/14; F01N 2900/08; F01N 2900/1602;
(Continued)

(56) References Cited

U.S. PATENT DOCUMENTS 3,982,515 A * 9/1976 Bradshaw .............. F02M 26/56
123/676
4,142,495 A * 3/1979 Lahiff .................... F02D 21/08
123/676
(Continued)

FOREIGN PATENT DOCUMENTS

EP      3067526        9/2016
JP      S56-154539   * 2/1981
(Continued)

OTHER PUBLICATIONS

International Search Report and Written Opinion for International Application No. PCT/JP2017/004253, dated Apr. 18, 2017, 10 pages, with English translation.
(Continued)

*Primary Examiner* — Jason D Shanske
*Assistant Examiner* — Matthew T Largi
(74) *Attorney, Agent, or Firm* — Fish & Richardson P.C.

(57) ABSTRACT

An exhaust purifying device mounted in a working vehicle includes: an exhaust passage through which an exhaust gas discharged from an engine flows; a throttle valve configured to change a passage area of the exhaust passage; an exhaust aftertreatment device disposed downstream of the throttle valve; and a valve controller configured to control an open degree of the throttle valve. The valve controller is configured to control the open degree of the throttle valve to be larger in a low load region below a predetermined load range and in a high load region exceeding the predetermined load range than in a medium load region that is the predetermined load range.

12 Claims, 6 Drawing Sheets

(51) Int. Cl.
*F01N 3/10* (2006.01)
*F02D 41/02* (2006.01)
*F02D 41/14* (2006.01)

(52) U.S. Cl.
CPC ....... *F02D 41/0275* (2013.01); *F02D 41/146* (2013.01); *F01N 2240/36* (2013.01); *F01N 2260/14* (2013.01); *F01N 2900/08* (2013.01); *F01N 2900/1602* (2013.01); *F01N 2900/1621* (2013.01); *F02D 41/024* (2013.01); *F02D 2200/0802* (2013.01); *F02D 2200/101* (2013.01); *F02D 2200/1002* (2013.01); *F02D 2700/04* (2013.01); *Y02A 50/2325* (2018.01); *Y02T 10/24* (2013.01)

(58) Field of Classification Search
CPC ......... F01N 2900/1621; F02D 41/0275; F02D 41/146; F02D 9/04; F02D 2200/0802; F02D 2200/1002; F02D 2200/101; F02D 2700/04; F02D 41/024; Y02A 50/2325; Y02T 10/24
See application file for complete search history.

(56) References Cited

U.S. PATENT DOCUMENTS

| | | | | |
|---|---|---|---|---|
| 4,835,963 | A * | 6/1989 | Hardy | F01N 3/023 123/323 |
| 6,192,858 | B1 * | 2/2001 | Nieberding | F02B 75/02 123/323 |
| 2002/0174648 | A1 * | 11/2002 | Minami | F01N 3/023 60/295 |
| 2005/0098148 | A1 | 5/2005 | Kuzuyama et al. | |
| 2006/0144374 | A1 * | 7/2006 | Nishimura | F02D 41/0052 123/568.16 |
| 2006/0179825 | A1 * | 8/2006 | Hu | B01D 46/0036 60/297 |
| 2011/0000194 | A1 * | 1/2011 | Gonze | F01N 3/027 60/286 |
| 2014/0008140 | A1 * | 1/2014 | Yoshida | F01N 3/0231 180/309 |
| 2014/0033923 | A1 * | 2/2014 | Yabe | B01D 46/0063 95/278 |

FOREIGN PATENT DOCUMENTS

| | | |
|---|---|---|
| JP | S56-154539 U1 | 2/1981 |
| JP | H09-060642 A | 3/1997 |
| JP | 2004-286012 | 10/2004 |
| JP | 2006-242175 | 9/2006 |
| JP | 2007-2668 | 1/2007 |
| WO | WO 2016/068347 | 5/2016 |

OTHER PUBLICATIONS

Japan Notice of Allowance in Japan Application No. 2017-511364, dated Jan. 9, 2018, 2 pages (with partial English translation).
International Search Report and Written Opinion for International Application No. PCT/JP2017/004253, dated Apr. 18, 2017, 8 pages.

* cited by examiner

EXHAUST PURIFYING DEVICE AND WORKING VEHICLE

CROSS-REFERENCE TO RELATED APPLICATIONS

This application claims priority to International Application No. PCT/JP2017/004253 filed on Feb. 6, 2017, the contents of which are incorporated herein in their entirety.

TECHNICAL FIELD

The present invention relates to an exhaust purifying device and a working vehicle.

BACKGROUND ART

A working vehicle such as a wheel loader includes an exhaust aftertreatment device (e.g., a diesel oxidant catalyst (DOC) and a selective catalytic reduction (SCR)) provided in an exhaust passage of an engine, the exhaust aftertreatment device being configured to burn particulate matters (PM) existing in an exhaust gas and purify nitrogen oxides (NOx) existing in the exhaust gas (see, for instance, Patent Literature 1).

In order to burn PM and purify NOx, it is required to increase a temperature of the exhaust gas. Accordingly, an exhaust throttle valve is provided in the exhaust passage upstream of the exhaust aftertreatment device, and the temperature of the exhaust gas is controlled by controlling an open degree of the exhaust throttle valve, so that the exhaust aftertreatment device is functionally optimized.

However, a frequent control of the open degree by the exhaust throttle valve causes abrasion on sliding surfaces between a bearing member and a valve body in the exhaust throttle valve. When the abrasion progresses, the exhaust throttle valve interferes with a housing to shorten a working lifetime.

Accordingly, Patent Literature 2 discloses a technique of forming the bearing member using a heat-resistant alloy (e.g., Inconel (trade mark)) formed of a sintered metal.

CITATION LIST

Patent Literatures

Patent Literature 1: International Publication No WO2016/068347
Patent Literature 2: JP 09-60642A

SUMMARY OF THE INVENTION

Problems to be Solved by the Invention

However, in the technique disclosed in Patent Literature 2, the bearing member has to be made of an expensive heat-resistant alloy, which results in a considerable increase in a manufacture cost.

It is also conceivable to reduce a sliding speed of the exhaust throttle valve. However, since the reduction of the sliding speed delays starting rotation of the engine, the reduction of the sliding speed is only applicable for closing the exhaust throttle valve. Consequently, the sliding speed of the exhaust throttle valve is not sufficiently reducible.

An object of the invention is to provide an exhaust purifying device and a working vehicle which are capable of prolonging a working lifetime of an exhaust throttle valve affected by abrasion between a valve body and a bearing member without considerably increasing a manufacture cost.

Means for Solving the Problem(s)

According to an aspect of the invention, an exhaust purifying device mounted in a working vehicle includes: an exhaust passage through which an exhaust gas discharged from an engine flows; a throttle valve configured to change a passage area of the exhaust passage; an exhaust aftertreatment device disposed downstream of the throttle valve; and a valve controller configured to control an open degree of the throttle valve, in which the valve controller is configured to control the open degree of the throttle valve to be larger in a low load region below a predetermined load range and in a high load region exceeding the predetermined load range than in a medium load region that is the predetermined load range.

According to the above aspect of the invention, since the valve controller controls the open degree of the throttle valve to be larger in the low load region and the high load region than in the medium load region, the open degree of the throttle valve is kept large while the working vehicle is accelerated at the start and is brought into a deceleration state. Accordingly, an increase in a sliding distance of the throttle valve, which is to be caused by controlling the open degree of the throttle valve, can be inhibited to reduce abrasion of the valve body and the bearing member, so that the working lifetime of the throttle valve can be prolonged.

DESCRIPTION OF EMBODIMENT(S)

Exemplary embodiment(s) of the invention will be described below with reference to the attached drawings.

[1] Schematic Structure of Exhaust Purifying Device 10

Figure 1:
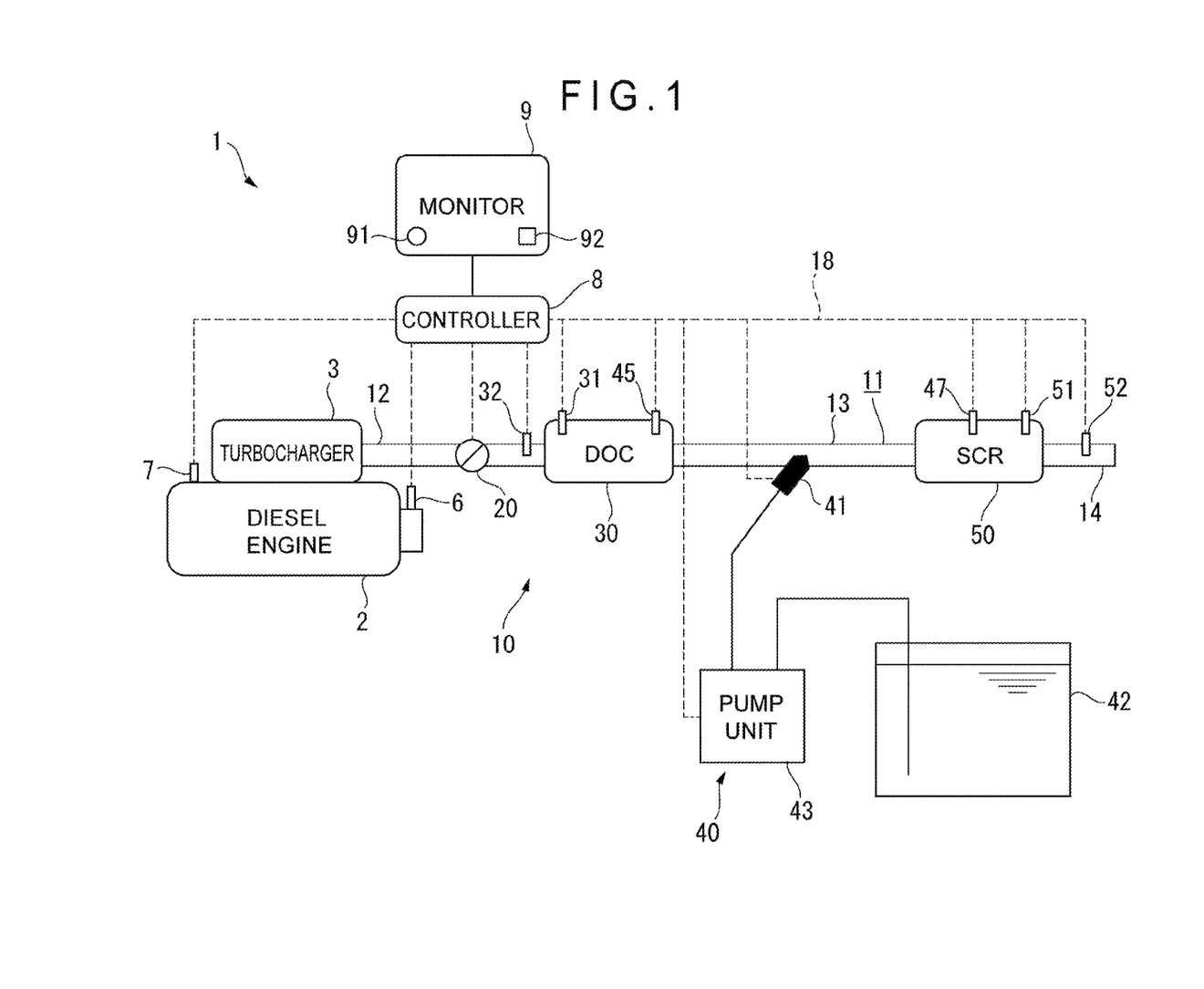
FIG. 1 schematically shows a structure of a working vehicle including an exhaust purifying device according to an exemplary embodiment of the invention.

FIG. 1 schematically shows a structure of a working vehicle 1 in which an exhaust purifying device 10 according to an exemplary embodiment of the invention is mounted.

Herein, the working vehicle 1 is a machine configured to work for excavation, ground leveling and the like and to deliver earth and sand and the like, for instance, in a mine and a construction site of a road and the like. Examples of the working vehicle 1 include: a construction machine such as a wheel loader and a wheel type backhoe; and a delivery vehicle such as a forklift.

The working vehicle 1 includes: a diesel engine 2; a turbocharger 3 including a turbine and configured to rotate the turbine by an exhaust gas of the diesel engine 2 to compress air to be supplied to the diesel engine 2; a controller 8; a monitor 9; and an exhaust purifying device 10.

The diesel engine 2 includes: an engine speed detector 6 configured to detect an engine speed; and a fuel injector 7 configured to inject a fuel to the diesel engine 2. Detection data of the engine speed detector 6 is outputted to the controller 8. The controller 8 is configured to control the fuel injector 7 in response to an accelerator operation and the like.

[2] Monitor 9

The monitor 9 includes a display and an input unit. The display includes a liquid crystal display and the like.

The display is configured to display various information (e.g., a cooling water temperature and a fuel residual amount), a caution and the like. The monitor 9 of the exemplary embodiment includes a notification unit 91 configured to notify an operator to prompt an execution of a later-described stationary manual regeneration. The monitor 9 functions as a notifying device configured to notify the operator of various information.

The input unit includes a switch (a button) provided around the display. The display displays an icon and the like representing a function of the input unit. Accordingly, in executing the stationary manual regeneration, the operator can easily recognize which switch he should press. When a touch-panel type monitor 9 is used, the operator only needs to touch a switch displayed on a touch panel. The monitor 9 of the exemplary embodiment includes a switch 92 configured to instruct the execution of the stationary manual regeneration. The input unit is not limited to the switch integrally provided with the monitor 9, but may be a switch provided in a casing and the like independent of the monitor 9.

[3] Exhaust Purifying Device 10

The exhaust purifying device 10 is configured to perform processes such as an oxidation and a reduction of a residual substance such as PM and NOx in an exhaust gas. The controller 8 is configured to control the exhaust purifying device 10.

The exhaust purifying device 10 includes: an exhaust throttle valve 20; and an exhaust aftertreatment device in a form of a DOC device 30, a urea-aqueous-solution injection system 40, and an SCR device 50, sequentially from an upstream side of a flow direction of an exhaust gas discharged from the diesel engine 2.

The DOC device 30, the urea-aqueous-solution injection system 40, and the SCR device 50 are disposed in a course of an exhaust passage 11 in which the exhaust gas flows from the diesel engine 2. The exhaust passage 11 includes: an inlet pipe 12 configured to introduce the exhaust gas from the turbocharger 3 connected to the diesel engine 2 into the DOC device 30; an outlet pipe 13 connecting the DOC device 30 to the SCR device 50; and an outlet pipe 14 connected to an outlet of the SCR device 50.

[4] Exhaust Throttle Valve 20

The exhaust throttle valve 20 includes a butterfly valve or the like disposed at the inlet pipe 12 and is configured to change a passage area of the exhaust passage 11. A valve open degree of the exhaust throttle valve 20 is controlled by the controller 8. As described later, a temperature of the exhaust gas is adjusted by adjusting the valve open degree.

When the valve open degree of the exhaust throttle valve 20 is decreased (i.e., an open area is decreased) to increase a pressure resistance, an internal pressure of the diesel engine 2 upstream of the exhaust throttle valve 20 is also increased. In order to maintain a torque outputted from the diesel engine 2 when the pressure resistance is thus increased, a fuel injection amount to be injected from the fuel injector needs to be increased, so that a burning temperature can be increased to increase the temperature of the exhaust gas. However, since the fuel injection amount is increased, a fuel efficiency is decreased.

At this time, although described in detail later, the controller 8 controls the valve open degree of the exhaust throttle valve 20 using map data for setting the valve open degree depending on the fuel injection amount and the engine speed.

Figure 2:
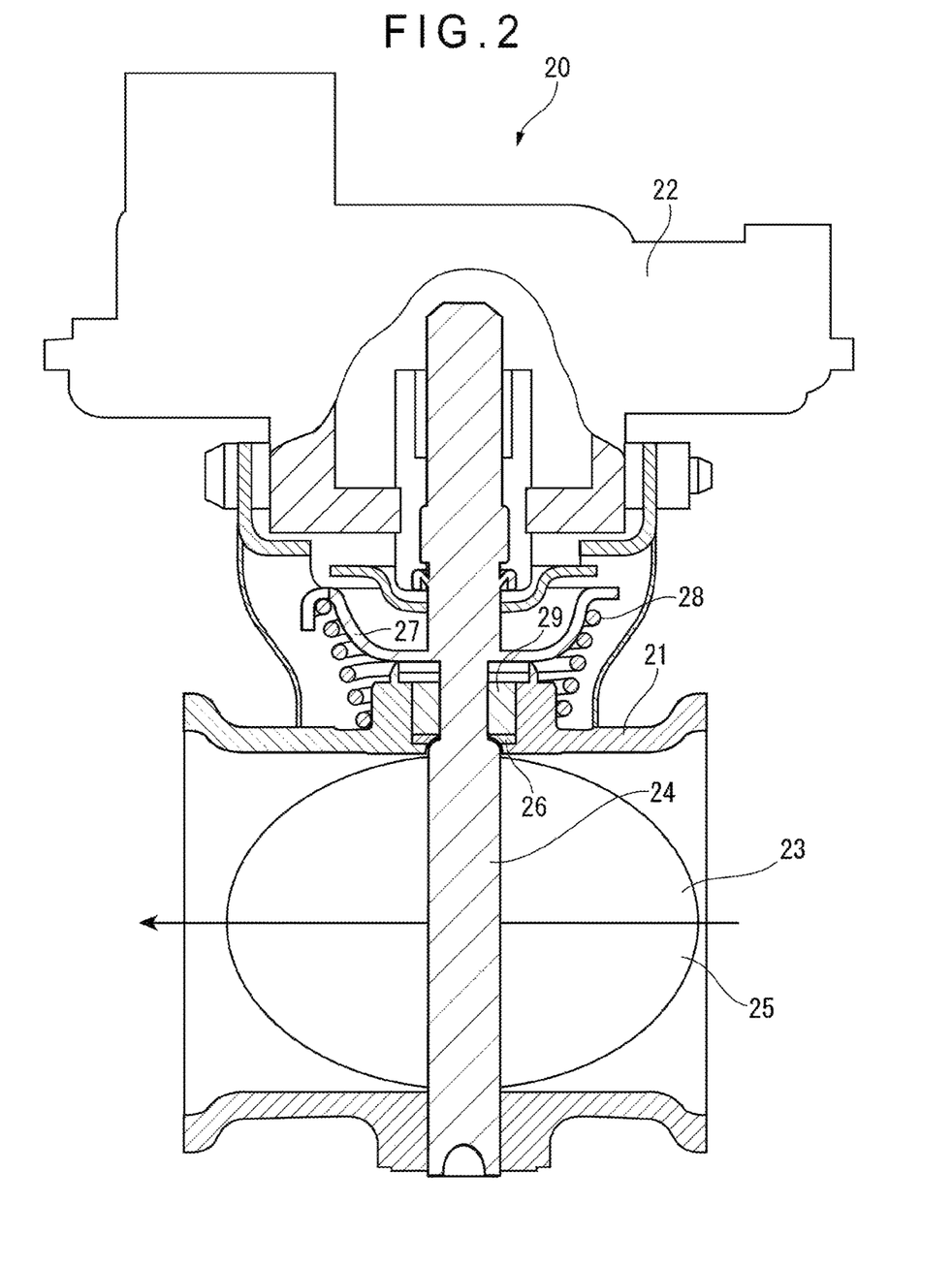
FIG. 2 is a cross section showing a structure of an exhaust throttle valve in the exemplary embodiment.

Specifically, as shown in FIG. 2, the exhaust throttle valve 20 includes: a housing 21 connected with the inlet pipe 12 (see FIG. 1); a motor 22 provided above the housing 21; a valve body 23 rotatable by the motor 22.

Figure 3:
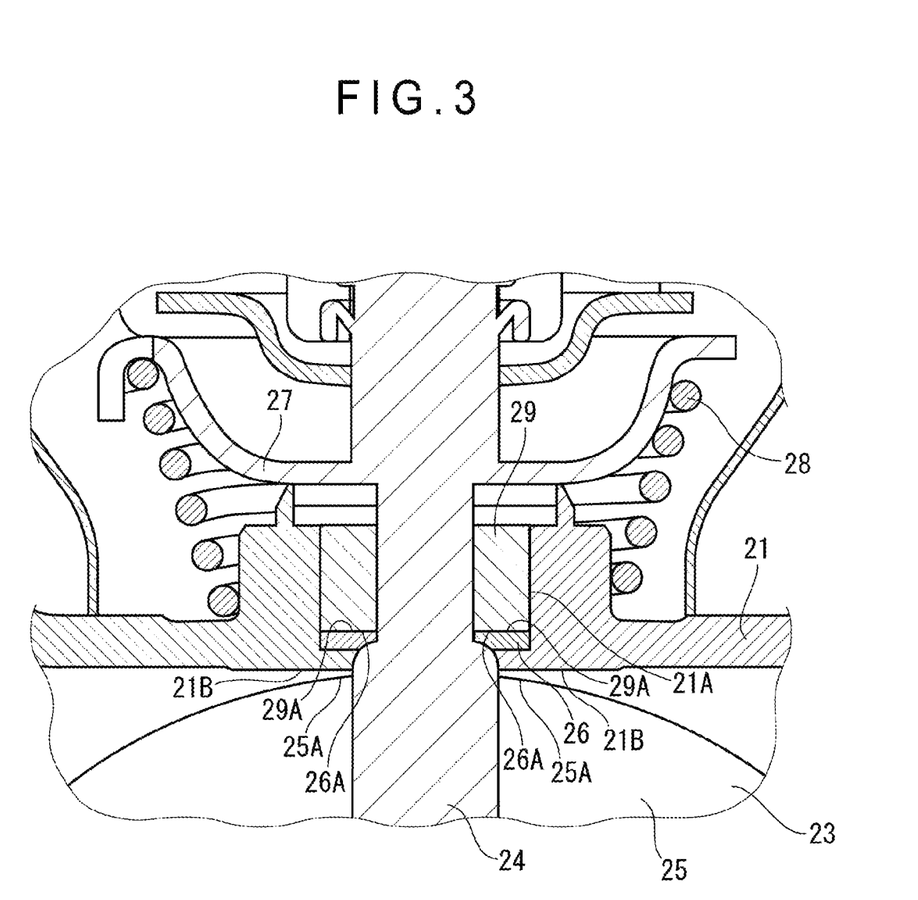
FIG. 3 is a cross section showing a relevant part of the exhaust throttle valve in the exemplary embodiment.

As shown in FIGS. 2 and 3, the valve body 23 includes: a shaft 24 rotatable by the rotation of a driving shaft (not shown) of the motor 22; and a flap 25 provided to the shaft 24 and configured to rotate to adjust an open degree of the exhaust passage 11.

As shown in FIG. 3, the housing 21 has a hole in which the shaft 24 is inserted. A spherical washer 26 is provided to an outer circumference of the shaft 24 to block the hole of the housing 21.

A retainer 27 is integrally formed with an upper side of the shaft 24 and is pressed upward by a spring 28. A bush 29 of the shaft 24 is attached in a recess 21A of the housing 21. An upper surface of the spherical washer 26 is slidably in contact with a lower surface of the bush 29.

A pinion gear is provided to the driving shaft of the motor 22. A gear (not shown) meshing with the pinion gear is provided at a base end of the shaft 24 of the valve body 23. When the motor 22 is driven, the gear is rotated via the pinion gear, thereby rotating the valve body 23.

When the valve body 23 is rotated by the motor 22, a lower surface 29A of the bush 29 and an upper surface 26A of the spherical washer 26 are slid in a rotational direction of the valve body 23. When a rotation frequency of the valve body 23 is increased, a sliding distance between the lower surface 29A of the bush 29 and the upper surface 26A of the spherical washer 26 is increased, so that the lower surface of the bush 29 is gradually worn. As the lower surface 29A of the bush 29 is worn, the valve body 23 is drawn upward by the spring 28, so that a top end 25A of the flap 25 interferes with an inner surface 21B of the housing 21, thereby requiring a large force to rotate the valve body 23. Accordingly, a working lifetime of the exhaust throttle valve 20 to adjust by rotation is shortened.

[5] DOC Device 30

The DOC device 30 includes a casing in which a diesel oxidation catalyst is housed.

The DOC device 30 is a catalyst to oxidize a fuel (dosing fuel) supplied as needed into the exhaust gas to generate heat, thereby increasing the temperature of the exhaust gas to a predetermined high temperature region. With use of the exhaust gas whose temperature is increased, PM present in the exhaust gas is burned and a later-described urea deposit accumulated in the outlet pipe 13 and the like is burned to be removed, thereby purifying and regenerating the exhaust gas.

[6] Urea-Aqueous-Solution Injection System 40

The urea-aqueous-solution injection system is configured to add a reductant aqueous solution in a form of a urea aqueous solution into the exhaust gas. The urea-aqueous-solution injection system 40 includes: an injection nozzle 41 attached to the outlet pipe 13 of the DOC device 30 and configured to inject the urea aqueous solution into the outlet pipe 13; a urea water tank 42 configured to store the urea aqueous solution; and a pump unit 43 configured to supply the urea aqueous solution from the urea water tank 42 to the injection nozzle 41.

The controller 8 is configured to control the injection nozzle 41 and the pump unit 43 to inject the urea aqueous solution from the injection nozzle 41 into the outlet pipe 13. The urea aqueous solution injected into the outlet pipe 13 is hydrolyzed by the heat of the exhaust gas to become ammonia.

[7] SCR Device 50

The SCR device 50 reduces and purifies nitrogen oxides present in the exhaust gas with ammonia (i.e., a reduction-causing agent) obtained by hydrolyzing the urea aqueous solution The ammonia is supplied to the SCR device 50 as a reduction-causing agent together with the exhaust gas.

An ammonia reduction catalyst may be provided downstream of the SCR device 50. The ammonia reduction catalyst oxidizes ammonia unused in the SCR device 50 to make the ammonia harmless, thereby further reducing emissions in the exhaust gas.

[8] Sensor

The exhaust purifying device 10 is provided with various sensors for detecting conditions of the diesel engine 2 and the exhaust purifying device 10.

Specifically, a NOx sensor 32 configured to detect a concentration of NOx contained in the exhaust gas is disposed to a side of the inlet pipe 12 downstream of the exhaust throttle valve 20. To the DOC device 30, an inlet temperature sensor 31 configured to measure an inlet temperature of the DOC device 30, and an outlet temperature sensor 45 configured to measure an outlet temperature of the DOC device 30 are provided.

An SCR internal temperature sensor 47 and an SCR outlet temperature sensor 51 configured to measure an outlet temperature of the DOC device 50 are provided to the SCR device 50.

An SCR outlet NOx sensor 52 configured to detect a concentration of NOx contained in the exhaust gas discharged from the SCR device 50 is disposed to the outlet pipe 14 connected to the SCR device 50.

These sensors are connected to the controller 8 via Controller Area Network (CAN) 18 and are configured to output measurement data to the controller 8.

[9] Controller 8

The controller 8 serving as a valve controller is configured to control an open degree of the exhaust throttle valve 20 during a steady operation of the working vehicle 1 to control the temperature of the exhaust gas to around 300 degrees C., thereby enhancing a purifying efficiency of the SCR device 50.

Figure 4:
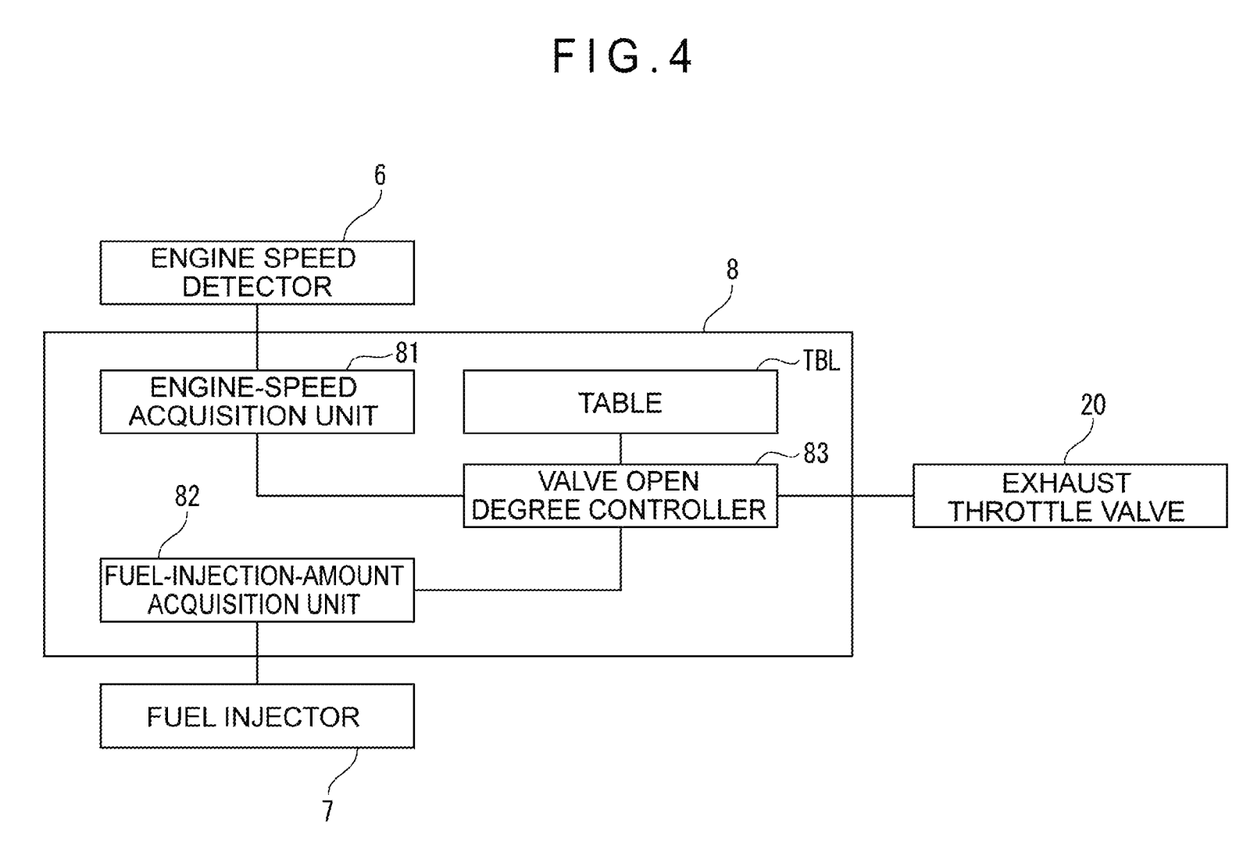
FIG. 4 is a functional block diagram showing a structure of a controller in the exemplary embodiment.

As shown in FIG. 4, the controller 8 includes an engine-speed acquisition unit 81, a fuel-injection-amount acquisition unit 82, and a valve open degree controller 83.

The engine-speed acquisition unit 81 is configured to acquire an engine speed of the diesel engine 2 based on a detection value of the engine speed detector 6.

A fuel injection amount injected by the fuel injector 7 is detected by a sensor (not shown) and is shown as a detection value. The fuel-injection-amount acquisition unit 82 is configured to acquire the detection value. The fuel injection amount is fluctuated mainly by an acceleration operation amount by an operator.

The valve open degree controller 83 is configured to control the open degree of the exhaust throttle valve 20 based on the engine speed acquired by the engine-speed acquisition unit 81 and the fuel injection amount acquired by the fuel-injection-amount acquisition unit 82.

Figure 5:
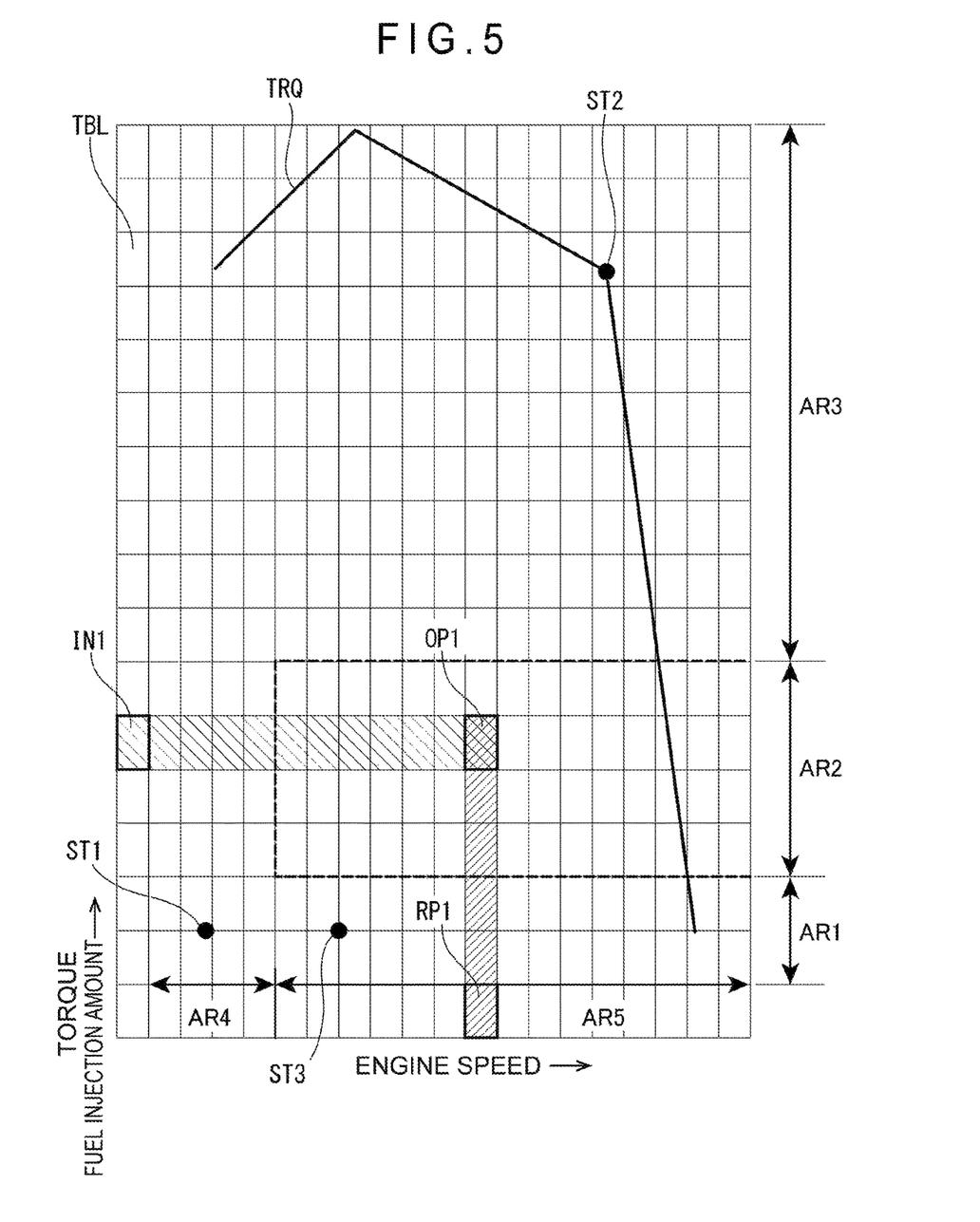
FIG. 5 schematically shows a map for controlling an open degree of the exhaust throttle valve in the exemplary embodiment.

Specifically, the valve open degree controller 83 controls the open degree of the exhaust throttle valve 20 with reference to a data table TBL shown in FIG. 5. The data table TBL records the open degrees of the exhaust throttle valve 20 according to the engine speed of the diesel engine 2 and the fuel injection amount by the fuel injector 7.

For instance, the data table TBL records an open degree OP1 of the exhaust throttle valve 20 at an engine speed RP1 and a fuel injection amount IN1. The valve open degree controller 83 outputs the open degree OP1 as an open degree command to the exhaust throttle valve 20, so that the motor 22 of the exhaust throttle valve 20 rotates the valve body 23 according to the open degree OP1.

In a map MAP of the exemplary embodiment, the open degree of the exhaust throttle valve 20 according to the fuel injection amount is set. The map MAP is sectioned into a low load region AR1, a medium load region AR2, and a high load region AR3.

The low load region AR1 below a predetermined load range is a region in which the produced torque is equal to or less than a torque at which the working vehicle 1 is driven, specifically, a region in which the fuel injection amount is below approximately 10% of a fuel injection amount of the diesel engine 2 in a rated output. The open degree of the exhaust throttle valve 20 in the low load region AR1 is set to be fully open (0%) in the exemplary embodiment. It should be noted that the open degree of the exhaust throttle valve 20 in the low load region AR1 is not necessarily set to be fully open, but only needs to be set larger than an open degree of the exhaust throttle valve 20 in the later-described medium load region AR2.

The medium load region AR2 that is a predetermined load range is a region in which the produced torque is equal to a torque that the working vehicle 1 requires for usual loading and unloading, specifically, a region in which the fuel injection amount is in a range from approximately 10% to less than approximately 40% of the fuel injection amount of the diesel engine 2 in a rated output. An open degree of the exhaust throttle valve 20 in the medium load region AR2 is in a range from approximately 70% to approximately 90%. The open degree of the exhaust throttle valve 20 is changed according to the fluctuation of the fuel injection amount and the engine speed.

The high load region AR3 exceeding the predetermined load range is a region in which the temperature of the exhaust gas is equal to or more than a regeneration temperature of the DOC device 30 and a purification temperature of the SCR device 50, and which is a region of the torque that working vehicle 1 requires for traveling for loading. Specifically, the high load region AR3 is a region in which the fuel injection amount is in a range from approximately 40% to 100% of the fuel injection amount of the diesel engine 2 in a rated output. The open degree of the exhaust throttle valve 20 in the high load region AR3 is set to be fully open (0%).

In other words, the open degree of the exhaust throttle valve 20 in the medium load region is set smaller than those in other load regions.

Moreover, the medium load region AR2 in the map MAP is sectioned into a low rotation region AR4 and a high rotation region AR5 of the engine speed.

The low rotation region AR4 of the engine speed is a region in which the engine speed is equal to or less than the engine speed of the diesel engine 2 at which the working vehicle 1 can be driven, specifically, a region in which the engine speed is in a range from approximately 400 rpm to approximately 1100 rpm. The open degree of the exhaust throttle valve 20 in the low rotation region AR4 is set to be fully open (0%).

The high rotation region AR5 of the engine speed is a region in which the engine speed falls within the engine speed of the diesel engine 2 at which the working vehicle 1 can be driven, specifically, a region in which the engine speed exceeds approximately 1100 rpm. The open degree of the exhaust throttle valve 20 in the high rotation region AR5 is set in a range from approximately 70% to approximately 90% as described above.

The open degree of the exhaust throttle valve 20 in the low rotation region AR4 is set to be fully open, because an engine oil and a lubricating oil for a driving system become highly viscous to increase agitation resistance and slide resistance of an accelerator, the engine, a pump and the like when the working vehicle 1 is kept in a low idling state at low temperatures in winter and the like. For this reason, a driving torque is increased to increase the fuel injection amount of the diesel engine 2. When the open degree of the exhaust throttle valve 20 is controlled in this state, the fuel injection amount approaches the region AR2 of a large fuel injection amount and repeats entering and exiting the region AR2 and the region AR1, so that the exhaust throttle valve 20 moves tremblingly to increase a sliding distance of the exhaust throttle valve 20.

Accordingly, the open degree of the exhaust throttle valve 20 is set to be fully open in the idling state of the working vehicle 1 irrespective of temperatures (low or high), whereby the exhaust throttle valve 20 is not moved, so that the sliding distance of the exhaust throttle valve 20 is decreased.

[10] Regeneration Process of SCR Device 50

When the urea aqueous solution is injected from the injection nozzle 41 as shown in FIG. 2 in a regeneration process, urea is sometimes crystallized to be deposited in the outlet pipe 13. For this reason, it is necessary to perform a purification process for increasing the temperature of the exhaust gas to decompose a substance (urea deposit) deposited in the outlet pipe 13. The purification process includes: an temperature-increasing control that is automatically performed when the working vehicle 1 is activated and kept being operated; and a stationary manual regeneration that is performed when an operator operates the switch 92 on the monitor 9 after the working vehicle 1 is stopped. The increasing-temperature control and the stationary manual regeneration are selectively switched to be controlled by the controller 8.

The controller 8 measures the temperature of the exhaust gas at the inlet of the DOC device 30 using the inlet temperature sensor 31, controls the open degree of the exhaust throttle valve 20 according to the measured temperature to adjust the temperature of the exhaust gas.

The controller 8 acquires the engine speed from the engine speed detector 6, acquires the temperature of the exhaust gas at the inlet of the DOC device 30 from the inlet temperature sensor 31, and acquires a NOx concentration at the inlet of the DOC device 30 from the NOx sensor 32. Moreover, the controller 8 acquires the temperature of the exhaust gas at the outlet of the DOC device 30 from the outlet temperature sensor 45, acquires the temperature of the SCR catalyst from the SCR internal temperature sensor 47, acquires the SCR outlet temperature from the SCR outlet temperature sensor 51, and acquires the NOx concentration at the outlet of the SCR device 50 from the SCR outlet NOx sensor 52.

The controller 8 controls the operations of the fuel injector 7, the exhaust throttle valve 20, the injection nozzle 41, and the pump unit 43 based on the acquired data and information (e.g., acceleration operation by an operator).

[11] Operation and Effects in Exemplary Embodiment(s)

Next, operation of the working vehicle 1 in a form of a wheel loader in the exemplary embodiment will be described with reference to FIGS. 5 and 6. Output torque of the working vehicle 1 transitions within a torque curve TRQ shown in FIG. 5.

Figure 6:
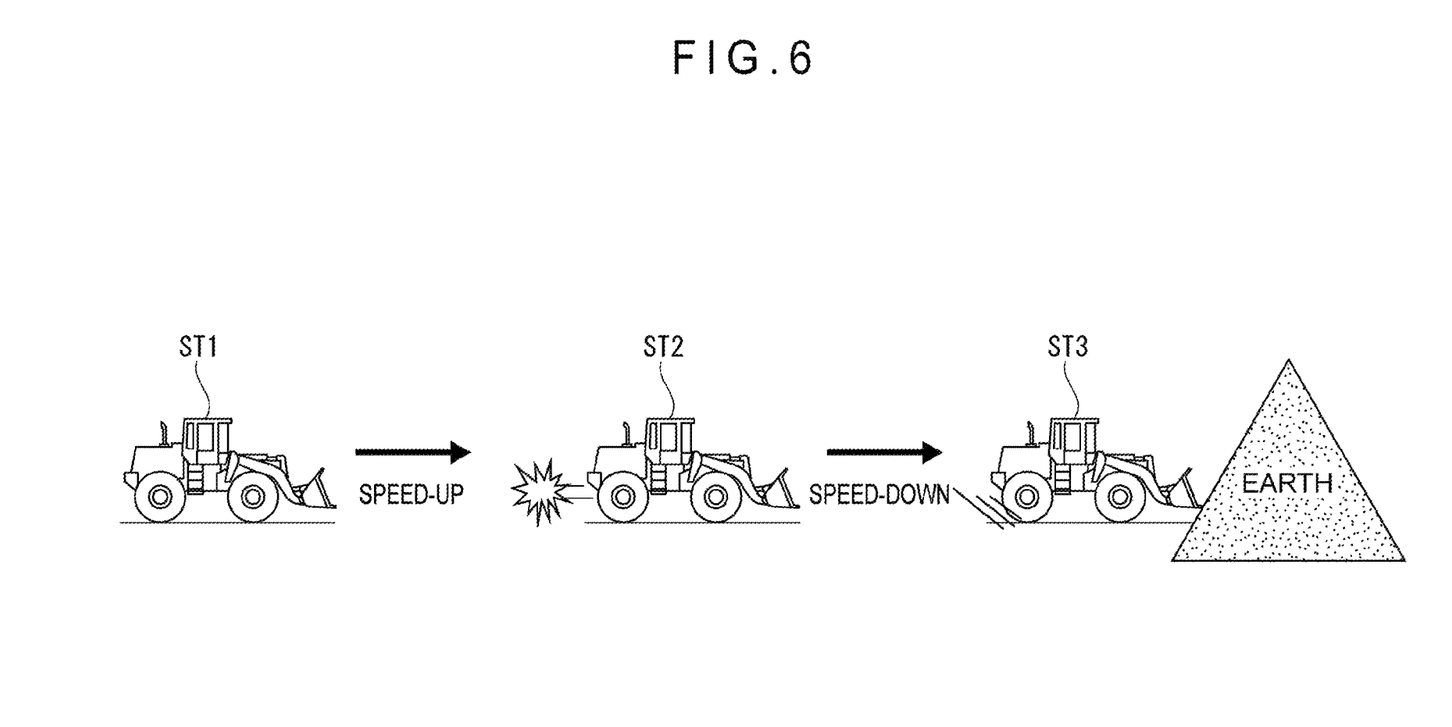
FIG. 6 schematically shows operations in the exemplary embodiment.

As a typical V-shape loading operation of the working vehicle 1 (e.g., a wheel loader) as shown in FIG. 6, firstly, an operator starts the diesel engine 2 and starts operating the working vehicle 1 in an idling state ST1.

Until reaching a loading site, the operator operates the working vehicle 1 in an accelerator full open state ST2 in which an accelerator is fully open.

When the working vehicle 1 approaches the loading site, the operator turns off the accelerator and puts on a brake to enter a deceleration state ST3.

Controlling the open degree of the exhaust throttle valve 20 accompanying the typical operation of the wheel loader will be described with reference to FIG. 5.

Firstly, in the idling state ST1, since the engine speed falls within the low rotation region AR4, the exhaust throttle valve 20 is brought into a full open state.

Next, in the accelerator full open state ST2 (rated point) in which the operator turns on the accelerator to be fully open, since the idling state ST1 is changed to the accelerator full open state ST2, the fuel injection amount transitions from the low rotation region AR4 to the high load region AR3 and the exhaust throttle valve 20 is kept in the full open state.

Lastly, when the working vehicle 1 is brought into the deceleration state ST3, since the accelerator is turned off and the brake is put on, the fuel is not injected and the fuel injection amount transitions from the high load region AR3 to the low load region AR1, whereby the exhaust throttle valve 20 is further kept in the full open state.

Here, at the transition from the accelerator full open state ST2 to the low load region AR1, the fuel injection amount falls within and then out of the medium load region AR2 in which the open degree of the exhaust throttle valve 20 is changed. However, even when the operator switches from the accelerator full open state to an accelerator-off state, an actual operation of the working vehicle 1 in response to the accelerator operation is delayed. Accordingly, due to the delayed response, the open degree of the exhaust throttle valve 20 on the map MAP directly transitions to the low load region AR1 without transitioning to the medium load region AR2, so that the open degree of the exhaust throttle valve 20 is kept to be fully open and the sliding distance of the exhaust throttle valve 20 is not increased.

Subsequently, when the working vehicle 1 starts a digging operation of earth and sands and the like, the fuel injection amount of the diesel engine 2 falls within the medium load region AR2 and the open degree of the exhaust throttle valve 20 is controlled based on the fuel injection amount according to a working load.

According to the exemplary embodiment, even when the state of the working vehicle 1 transitions from the idling state ST1 to the accelerator full open state ST2 and further to the deceleration state ST3, the open degree of the exhaust throttle valve 20 is kept in a full open state in the low load region AR1 and the high load region AR3. Accordingly, even when the fuel injection amount is changed from the fuel amount in the low load region AR1 to the fuel amount in the high load region AR3, the sliding distance of the exhaust throttle valve 20 is not increased, thereby minimizing wear of the bush 29 of the exhaust throttle valve 20, so that an operation failure of the exhaust throttle valve 20 is preventable. Particularly, since the working vehicle 1 such as the wheel loader performs typical operations of transition from the idling state ST1 to the accelerator full open state ST2 and the deceleration state ST3, the exemplary embodiment is effective.

[12] Modification in Exemplary Embodiment

The invention is by no means limited to the above-described exemplary embodiment, but encompasses modifications described below.

In the above-described exemplary embodiment, the open degree of the exhaust throttle valve 20 in the low rotation region AR4 of the engine speed is set to be fully open, but not limited thereto and may also be set at the same degree as in the high rotation region AR5.

In the above-described exemplary embodiment, the working vehicle 1 is a wheel loader. However, the application of the invention is not limited thereto and the invention may be applied to a wheel type backhoe, a forklift and the like. In short, the invention is applicable to a wheel working vehicle.

In the above-described exemplary embodiment, the open degree of the exhaust throttle valve 20 provided in the exhaust passage 11 is controlled. However, the invention is applicable not only to the exhaust throttle valve 20 but also to an intake throttle valve.

Further, the specific arrangements and configurations of the invention may be altered in any manner in actual implementation as long as the modifications and improvements are compatible with the invention.

The invention claimed is:

1. An exhaust purifying device mounted in a working vehicle, the exhaust purifying device comprising:
   an exhaust passage through which an exhaust gas discharged from an engine flows;
   a throttle valve configured to change a passage area of the exhaust passage;
   an exhaust aftertreatment device disposed downstream of the throttle valve; and
   a valve controller configured to control an open degree of the throttle valve, wherein the valve controller is configured to:
      control the open degree of the throttle valve in each of a low load region below a predetermined load range and a high load region exceeding the predetermined load range to be larger than the open degree of the throttle valve in a medium load region that is the predetermined load range,
      control the open degree of the throttle valve in the low load region to be the same as the open degree of the throttle valve in the high load region, and
      maintain the open degree of the throttle valve to be unchanged based on the working vehicle directly transitioning from the high load region to the low load region.

2. The exhaust purifying device according to claim 1, wherein
   the valve controller is configured to control the open degree of the throttle valve to be larger in a low rotation region, in which an engine speed of the engine is equal to or less than a predetermined engine speed, than in the medium load region.

3. The exhaust purifying device according to claim 1, wherein
   the low load region is a region in which a torque is equal to or less than a torque at which the working vehicle is driven.

4. The exhaust purifying device according to claim 1, wherein
   the exhaust aftertreatment device comprises a diesel oxidation catalyst device and a selective catalytic reduction device.

5. An exhaust purifying device mounted in a working vehicle, the exhaust purifying device comprising:
   an exhaust passage through which an exhaust gas discharged from an engine flows;
   a throttle valve configured to change a passage area of the exhaust passage;
   an exhaust aftertreatment device disposed downstream of the throttle valve; and
   a valve controller configured to control an open degree of the throttle valve, wherein the valve controller is configured to:
      control the open degree of the throttle valve in a medium load region that is a predetermined load range to be smaller than the open degree of the throttle valve in each of load ranges different from the medium load region,
      control the open degree of the throttle valve in each of the load ranges to be the same, and
      maintain the open degree of the throttle valve to be unchanged based on the working vehicle directly transitioning between the load ranges without transitioning to the medium load region.

6. The working vehicle comprising the exhaust purifying device according to claim 1.

7. The working vehicle comprising the exhaust purifying device according to claim 5.

8. An exhaust purifying device mounted in a working vehicle, the exhaust purifying device comprising:
   an exhaust passage through which an exhaust gas discharged from an engine flows;
   a throttle valve configured to change a passage area of the exhaust passage;
   an exhaust aftertreatment device disposed downstream of the throttle valve; and
   a valve controller configured to control an open degree of the throttle valve, wherein the valve controller is configured to:
      control the open degree of the throttle valve in each of a low load region below a predetermined load range and a high load region exceeding the predetermined load range to be larger than the open degree of the throttle valve in a medium load region that is the predetermined load range,
      control the open degree of the throttle valve in the low load region to be the same as the open degree of the throttle valve in the high load region, and
      maintain the open degree of the throttle valve to be unchanged based on an accelerator of the working vehicle changing from a full open state to an accelerator-off state by applying a brake.

9. The exhaust purifying device according to claim 8, wherein
   the valve controller is configured to control the open degree of the throttle valve to be larger in a low rotation region, in which an engine speed of the engine is equal to or less than a predetermined engine speed, than in the medium load region.

10. The exhaust purifying device according to claim 8, wherein the low load region is a region in which a torque is equal to or less than a torque at which the working vehicle is driven.

11. The exhaust purifying device according to claim 8, wherein
the exhaust aftertreatment device comprises a diesel oxidation catalyst device and a selective catalytic reduction device.

12. The working vehicle comprising the exhaust purifying device according to claim 8.

* * * * *